July 26, 1949.   W. WEITZEN   2,477,025
ROTARY SELECTOR VALVE

Filed Sept. 27, 1946   4 Sheets-Sheet 1

INVENTOR.
WILLIAM WEITZEN
BY Wade Koonty AND
Frederick W. Cotterman
ATTORNEYS

July 26, 1949.                    W. WEITZEN                          2,477,025
                               ROTARY SELECTOR VALVE
Filed Sept. 27, 1946                                                4 Sheets-Sheet 2
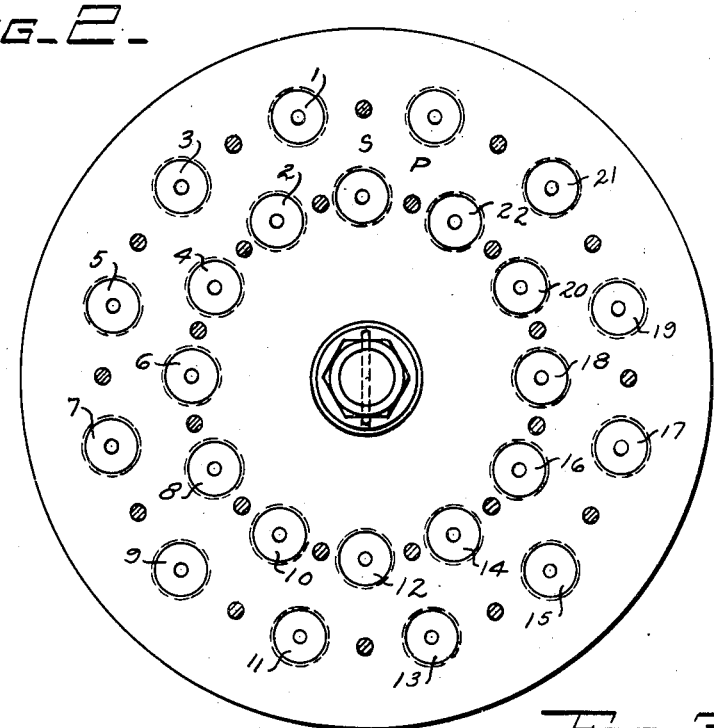
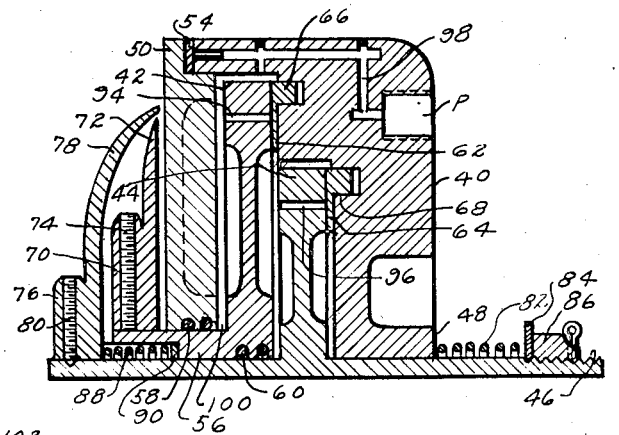
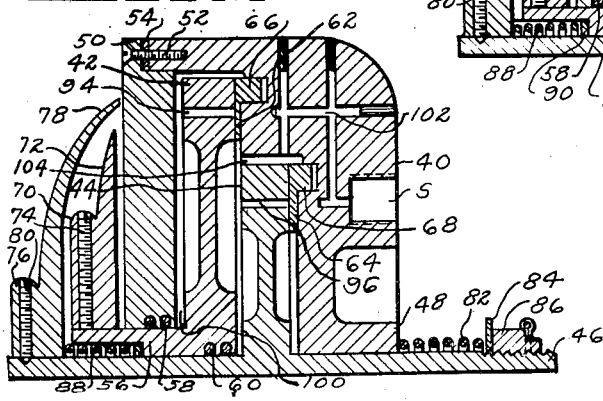
INVENTOR.
WILLIAM WEITZEN
BY Wade Koontz AND
Frederick W. Cotterman
ATTORNEYS July 26, 1949.                    W. WEITZEN                    2,477,025
                              ROTARY SELECTOR VALVE
Filed Sept. 27, 1946                                        4 Sheets-Sheet 3
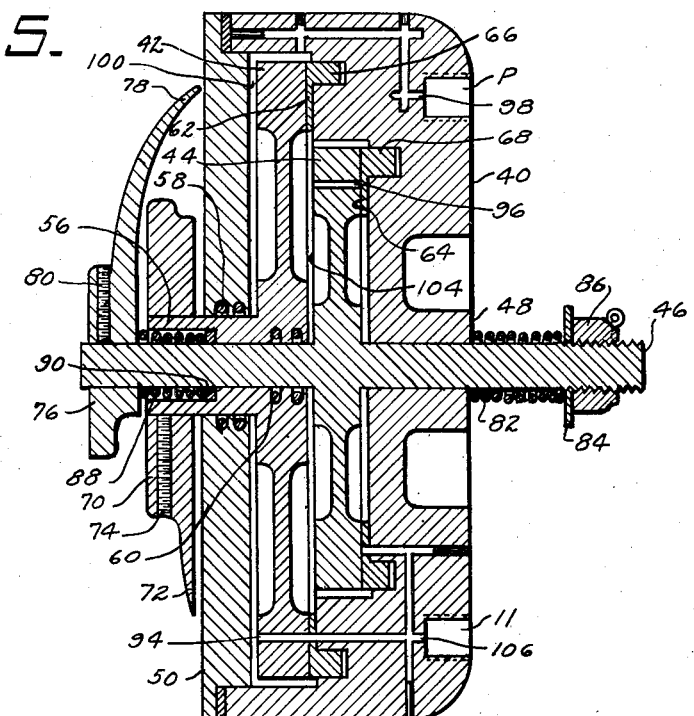
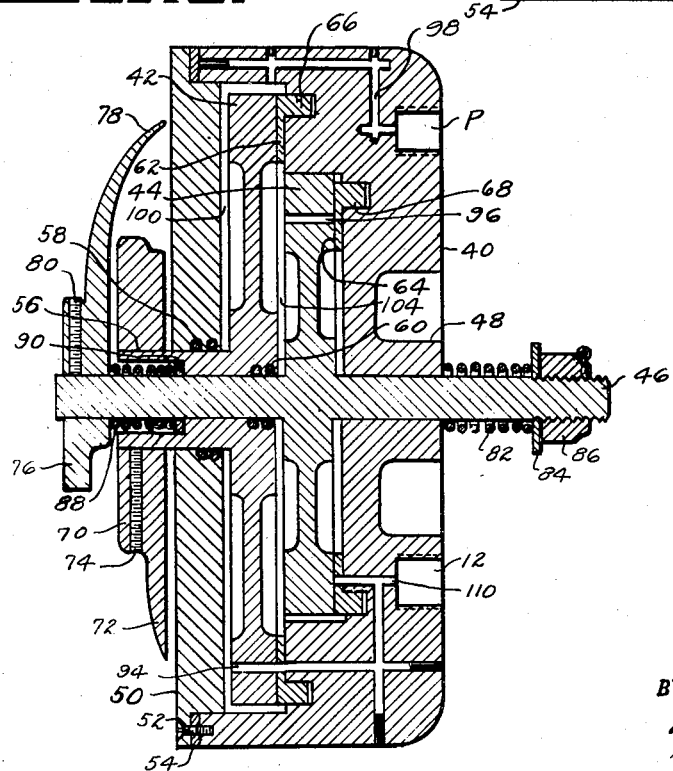
INVENTOR.
WILLIAM WEITZEN
BY Wade Koontz AND
Frederick W. Cotterman
ATTORNEYS July 26, 1949.　　　　　W. WEITZEN　　　　　2,477,025
ROTARY SELECTOR VALVE
Filed Sept. 27, 1946　　　　　　　　　　　　　　　4 Sheets-Sheet 4

INVENTOR.
WILLIAM WEITZEN
ATTORNEYS

Patented July 26, 1949

2,477,025

UNITED STATES PATENT OFFICE 2,477,025

ROTARY SELECTOR VALVE

William Weitzen, Dayton, Ohio

Application September 27, 1946, Serial No. 699,652

4 Claims. (Cl. 277—59)

(Granted under the act of March 3, 1883, as amended April 30, 1928; 370 O. G. 757)

The invention described herein many be manufactured and used by or for the Government for governmental purposes without the payment to me of any royalty thereon.

This invention relates to selector valves and particularly to selector valves of the rotary type.

An object of the invention is to provide a device whereby any one of a plurality of sources may be selectively connected to a single gauge to show the pressure or suction of the selected source with respect to atmosphere or with respect to any other selected reference pressure.

Another object is to provide a device whereby any two of a plurality of sources may be selectively connected to the same gauge to show the difference in pressure between the two sources.

Another object is to provide means whereby a relatively large number of pressure sources may be connected to the device at the same time, through certain sources selected and tested for pressure or pressure difference as desired.

Further objects and advantages will become evident as the invention is further described with reference to the drawings wherein, Fig. 1 is a front view of an embodiment of the invention showing the dial, pointer and setting knobs.

Fig. 2 is a rear view showing the outlets for connection to the various pressure sources and to the gauge.

Fig. 3 is an axial half section taken at 3—3 of Figs. 1 and 2, as when the pointers are both at P.

Fig. 4 is an axial half section taken at 4—4 of Figs. 1 and 2, as when the pointers are both at S.

Fig. 5 is an axial section taken at 5—5 of Figs. 1 and 2 as when the pointer of the larger setting knob is at 11.

Fig. 6 is an axial section at 6—6 of Figs. 1 and 2, as when the pointer of the larger setting knob is at 12.

Like reference characters refer to like parts throughout the several views.

Figure 1:
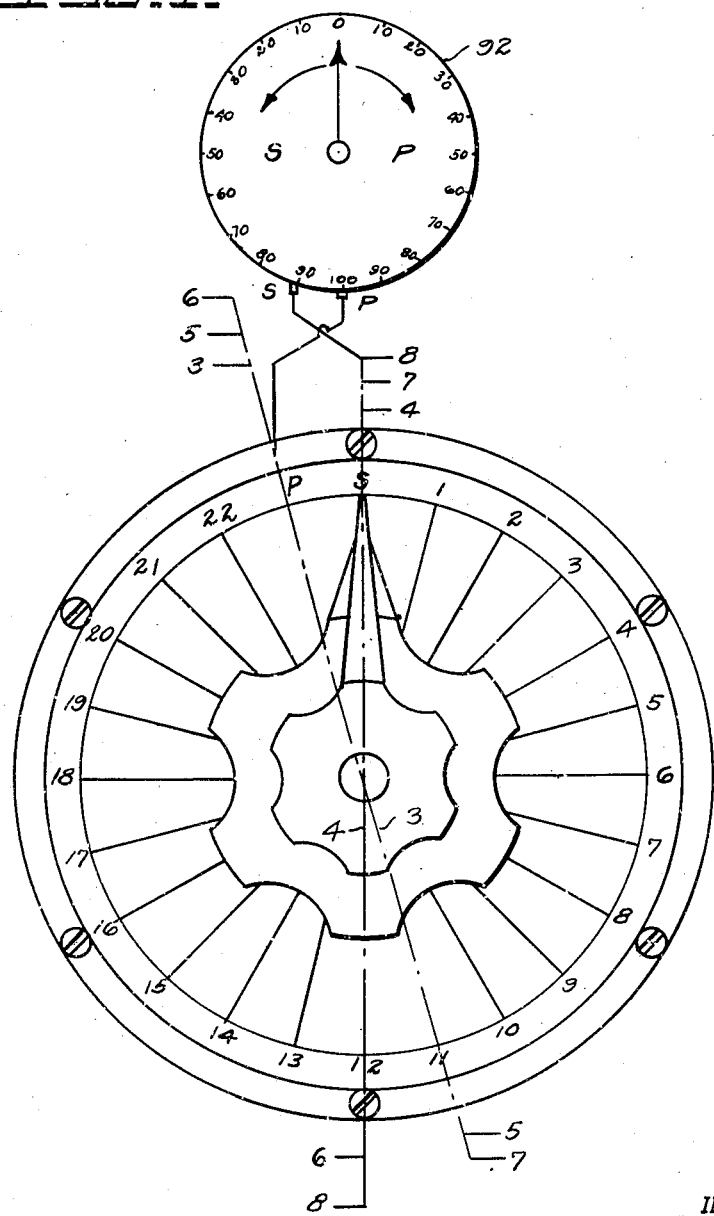

The body or stator 40 is chambered to house the large rotor 42 and smaller rotor 44. The smaller rotor 44 has a shaft 46 which may be integral part of the rotor or be made separately and the rotor secured thereto. The rearward portion of shaft 46 is journalled in a bearing hub 48 of the stator or body. A cover 50 encloses the two rotors and is fastened to the body by screws 52. A gasket 54 between the body 40 and cover 50 provides a pressure tight joint.

The large rotor 42 has a hollow shaft 56 which, on the outside, has rotative bearing in the cover 50 and on the inside provides rotative bearing for the forward portion of the shaft 46. Seals 58 prevent leakage between the cover 50 and hollow shaft 56 and seals 60 prevent leakage between the hollow shaft 56 and the shaft 46.

The rearward faces of the rotors 42 and 44 are provided with bearing surfaces on the forward sides of plates 63 and 64, respectively. Plates 62 and 64 have annular portions 66 and 68 which are press fitted into corresponding grooves in the body 40, the forward surfaces of the plates being then preferably ground and lapped in situ.

That portion of the hollow shaft 56 which projects forwardly through the cover 50 is provided with a large setting knob 70 having a pointer 72. The knob 70 and pointer 72 are integral in the exemplification shown but may, of course, be separately made and assembled by any conventional means if so desired. A screw 74 secures the knob 70 to the hollow shaft 56.

That portion of the shaft 46 which projects forwardly through the hollow shaft 56 is provided with a relatively smaller setting knob 76 which carries a pointer 78, the knob being secured to the shaft by a screw 80. A relatively strong compression spring 82 reacts against a washer 84 and castle nut 86 to maintain suitable contact of the small rotor 44 with the plate 64. A lighter compression spring 88 reacts against a washer 90 to maintain suitable contact of the large rotor 42 with the plate 62.

The rearward face of the body 40 is provided with two concentric circular rows of tapped outlets consecutively numbered 1, 2, 3, etc., the odd numbers being assigned to the outer row and the even numbers to the inner row. Two outlets marked P and S are reserved for connection to the P and S terminals of a zero center pressure gauge 92. One or more additional outlets as for instance 21 and/or 22 may be reserved for connection to the atmosphere or to any fixed reference pressure with which pressure sources are to be compared and pressure differences measured.

A single opening 94 extends through the large rotor 42, the opening 94 being preferably in alignment with the pointer 72. Another single opening 96 extends through the small rotor 44, the opening 96 being preferably in alignment with the pointer 78.

A passageway 98, seen in Figs. 3, 5 and 6, connects the P outlet to the space 100 at the forward face and around the outside of the large rotor 42. A passageway 102, seen in Figs. 4, 7 and 8, connects the S outlet to the space 104 at the forward face and around the outside of the small rotor 44.

Figure 7:
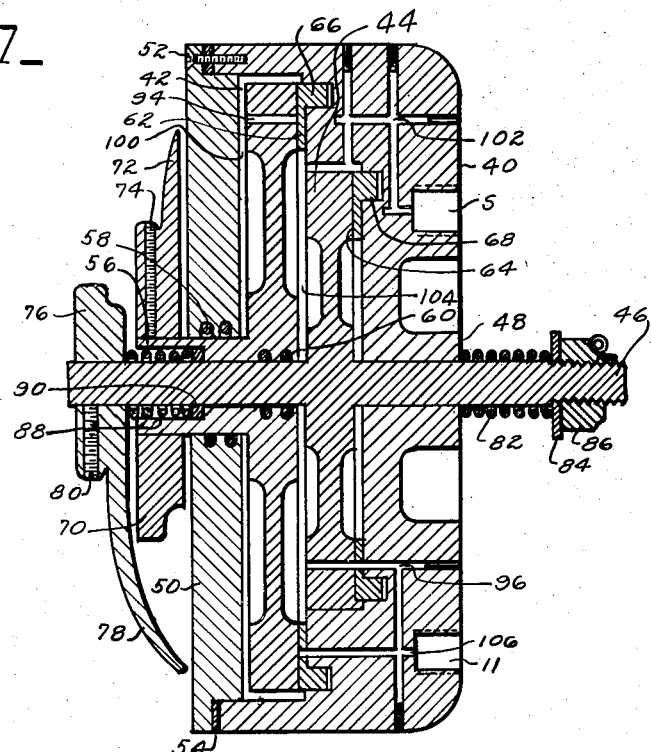
Fig. 7 is an axial section taken at 7—7 of Figs. 1 and 2 as when the pointer of the smaller setting knob is at 11.

A passageway 106 connects the odd numbered outlet 11 to the forward faces of both plates 62 and 64 (see Figs. 5 and 7), and if the large knob pointer 72 is then at 11, so as to place the opening 94 in communication with the passageway 106 as in Fig. 5, the odd numbered outlet 11 will be connected to the gauge outlet P as in Fig. 5, while if the small knob pointer 78 is then at 11, so as to place the opening 56 in communication with the passageway 106 as in Fig. 7, the odd numbered outlet 11 will be connected to the gauge outlet S. The passageway 106 shown extending from the outlet 11 is exactly typical of the passageways extending from all odd numbered outlets.

Figure 8:
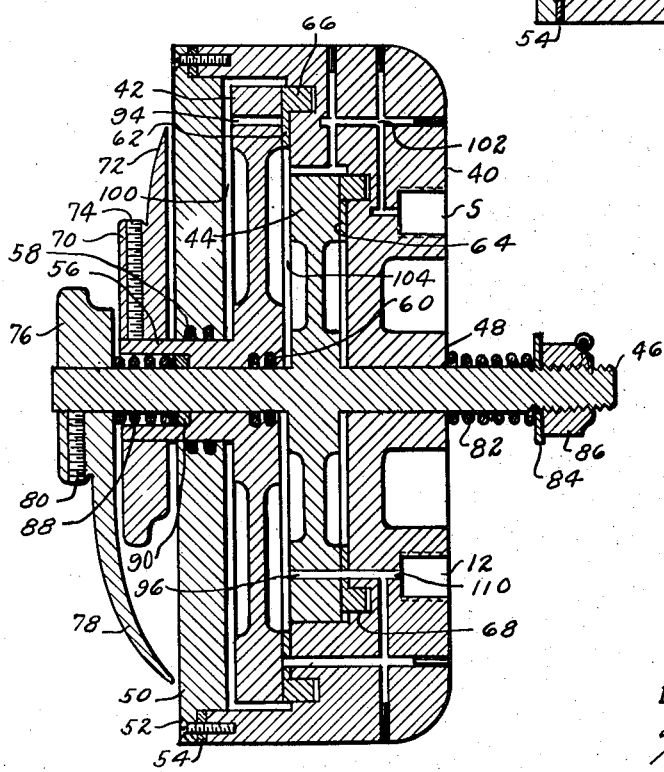
Fig. 8 is an axial section taken at 8—8 of Figs. 1 and 2 as when the pointer of the small setting knob is at 12.

A passageway 110 connects the even numbered outlet 12 to the forward faces of both plates 62 and 64 (see Figs. 6 and 8) and if the large knob pointer 72 is then at 12, so as to place the opening 94 in communication with the passageway 110 as seen in Fig. 6, the even numbered outlet 12 will be connected to the gauge outlet P as in Fig. 6, while if the small knob pointer 78 is then at 12, so as to place the opening 96 in communication with the passageways 110 as in Fig. 8, this even numbered outlet 12 will be connected to the gauge outlet S as in Fig. 8. The passageway 110 shown extending from the outlet 12 is exactly typical of the passageways extending from all even numbered outlets.

From Figs. 3 and 4 it will be apparent that when either the large or the small knob pointers 72 or 78 point to the P or the S positions, there will be no connection between any of the numbered outlets and the P or S outlets for the reason that, at these positions, there is no opening through the plates 62 or 64 and the single openings 94 and 96 are at these points on the plates 62 or 64 which do not have openings. Figs. 5 through 8, however, show that the passageways 106 and 110 extending from the odd and even numbered outlets all extend to and through the plates 62 and 64 (see Figs. 6 and 8), and if the large knob pointer 72 is then at 12, so as to place the opening 94 in communication with the passageway 110 as seen in Fig. 6, the even numbered outlet 12 will be connected to the gauge outlet P as in Fig. 6, while if the small knob pointer 78 is then at 12, so as to place the opening 96 in communication with the passageways 110 as in Fig. 8, the even numbered outlet 12 will be connected to the gauge outlet S as in Fig. 8. The passageway 110 shown extending from the outlet 12 is exactly typical of the passageways extending from all even numbered outlets.

From Figs. 3 and 4 it will be apparent that when either the large or the small knob pointers 72 or 78 point to the P or the S positions, there will be no connection between any of the numbered outlets and the P or S outlets for the reason that, at these positions, there is no opening through the plates 62 or 64 and the single openings 94 and 96 are at these points on the plates 62 or 64 which do not have openings. Figs. 5 through 8, however, show that the passageways 106 and 110 extending from the odd and even numbered outlets all extend to and through the plates 62 and 64.

It will be obvious that if all of the numbered outlets were in a single circular row, passageways 106 and 110 could be made exactly alike.

It will now be apparent that placing the large knob pointer opposite any numbered outlet connects that outlet to the P gauge outlet, while placing the small knob pointer opposite any numbered outlet connects that outlet to the S gauge outlet.

The operation of the device is substantially as follows:

Assume that outlet 21 has been left open to atmosphere and that a source of suction, i. e., negative pressure, is connected to the outlet 11 and that it is desired only to measure the suction of the source with respect to atmospheric pressure, the outlet 11 may be connected to S by placing the small knob pointer at 11 as in Fig. 7, then placing the large knob pointer at 21 for connecting the outlet 21 to P, just as the outlet 11 is connected to P in Fig. 5. The suction side S of the gauge 92 will now be connected to 11 and the pressure side P will be connected to atmosphere, the gauge 92 thereby reading the subatmospheric pressure of the source which is connected to outlet 11. If the source connected to 11 had been positive, 11 should have been connected to P as it is connected to P in Fig. 5, and 21 should have been connected to S as 11 is connected to S in Fig. 7. The positive pressure at 11 with respect to atmosphere would then have been registered on the P side of the gauge 92. The foregoing is descriptive of the manner in which a positive or negative pressure may be measured with respect to the pressure of the ambient air. Where the atmospheric pressure varies as for instance on an aircraft, an outlet as at 22 may be connected to any fixed pressure source and used as a reference pressure outlet instead of 21.

Assume again that the difference between a greater positive pressure source which is connected to 12, and a lesser positive pressure source which is connected to 11 is to be determined at a single setting of the knobs. By turning the large knob pointer to 12 as in Fig. 6, and the small knob pointer to 11 as in Fig. 7, the greater pressure will be connected to the P side of the gauge 92 and the lesser pressure to the S side, whereby the difference between the two pressures will be visually recorded at one setting. It will be evident that any pressure source which is connected to one of the outlets may be used as a reference pressure against which all other pressure sources may be evaluated.

The device is highly advantageous in that it is extremely small and light considering the great number of outlets involved and in that it requires only a single gauge, and may therefore be used in restricted spaces as in flight test work where numerous pressure indicators cannot be installed due to a lack of space.

Having described an embodiment of my invention, I claim:

1. A rotary selector valve which comprises a housing in the form of a cylinder with both ends closed, two concentric circular rows of pressure receiving openings in the rearward end wall of the cylinder, one row within the other, two concentric axially spaced disc type rotors independently rotatable within said housing, one rotor being smaller than the other and positioned nearer the rearward end of said housing, two concentric shafts, one extending from each rotor forwardly through the front wall of said housing, two valve setting knobs with pointers, one on each shaft outside and adjacent the front of said housing, a circular row of indicia on the front of said housing corresponding in number and position to the pressure receiving openings in the rear wall of said housing, two seats in said housing, one for each rotor, positioned to be engaged by the rearward faces of said rotors, a spring for each motor urging it upon its seat, a large and a small pressure tight chamber formed around the forward faces of the large and small rotor respectively, a single axially parallel port through each rotor circumferentially positioned to correspond to said pointers, and passageways, one connecting one of the outer row of pressure receiving openings to the larger chamber, one connecting one of the inner row of pressure receiving openings to the smaller chamber, and one connecting each of the remaining pressure receiving openings to the forward faces of both the large and the small rotor seats.

2. A rotary selector valve which comprises a housing in the form of a cylinder with both ends closed, a series of circularly arranged pressure receiving openings in the rearward end wall of the cylinder, two concentric axially spaced disc type rotors independently rotatable within said housing, one rotor being positioned nearer the rearward end of said housing than the other, two concentric shafts, one extending from each rotor forwardly through the front wall of said housing, two valve setting knobs with pointers, one on each shaft outside and adjacent the front of said housing, a circular row of indicia on the front of said housing corresponding to the pressure receiving openings in the rear wall of said housing, two seats in said housing, one for each rotor, positioned to be engaged by the rearward faces of said rotors, a spring for each rotor urging it upon its seat, a separate pressure tight chamber formed around the forward face of each rotor, a single axially parallel port through each rotor circumferentially positioned to correspond to said pointers, and passageways, one connecting one of the pressure receiving openings to one chamber, one connecting another of the pressure receiving openings to the other chamber, and one connecting each of the remaining pressure receiving openings to the forward faces of both rotor seats.

3. A rotary selector valve which comprises a housing in the form of a cylinder with both ends closed, a series of pressure receiving openings in the rearward end wall of the cylinder, two concentric axially spaced disc type rotors independently rotatable within said housing, one rotor being positioned nearer the rearward end of said housing than the other, two concentric shafts, one extending from each rotor forwardly through the front wall of said housing, two valve setting means with pointers, one on each shaft outside and adjacent the front of said housing, a circular row of indicia on the front of said housing corresponding in number to the pressure receiving openings in the rear wall of said housing, two seats in said housing, one for each rotor, positioned to be engaged by the rearward faces of said rotors, a separate pressure tight chamber formed around each of the forward faces of the rotors, a single axially parallel port through each rotor positioned to correspond to said pointers, and passageways, one connecting one of the pressure receiving openings to one chamber, one connecting another of the pressure receiving openings to the other chamber, and one connecting each of the remaining pressure receiving openings to the forward faces of both rotor seats.

4. A selector valve which comprises a closed housing, pressure receiving openings in the wall of the housing, two rotors independently rotatable within said housing, two shafts, one extending from each rotor through the wall of said housing, two valve setting means with pointers, one on each shaft outside of said housing, indicia on said housing corresponding in number to the pressure receiving openings in the wall of said housing, two seats in said housing, one for each rotor, positioned to be engaged by one of the faces of said rotors, a separate pressure tight chamber formed around the other of the faces of the rotors, a single opening through each rotor positioned to correspond to said pointers, and passageways, one connecting one of the pressure receiving openings to one chamber, one connecting another of the pressure receiving openings to the other chamber, and one connecting each of the remaining pressure receiving openings to the faces of both rotor seats.

WILLIAM WEITZEN.

REFERENCES CITED

The following references are of record in the file of this patent:

UNITED STATES PATENTS

| Number | Name | Date |
|---|---|---|
| 735,162 | Settino | Aug. 4, 1908 |
| 1,291,834 | Gold | Jan. 21, 1919 |
| 1,489,396 | Odum | Apr. 8, 1924 |
| 1,528,825 | Hamilton | Mar. 10, 1925 |